US012718279B2

(12) United States Patent
Song et al.

(10) Patent No.: US 12,718,279 B2
(45) Date of Patent: Aug. 25, 2026

(54) SYSTEM AND METHOD FOR SEARCHING IMAGE OF GOODS

(71) Applicant: NHN Corporation, Seongnam-si (KR)

(72) Inventors: Chiyoung Song, Gyeonggi-do (KR); Seonhee Seok, Gyeonggi-do (KR)

(73) Assignee: NHN CORPORATION, Gyeonggi-do (KR)

( * ) Notice: Subject to any disclaimer, the term of this patent is extended or adjusted under 35 U.S.C. 154(b) by 613 days.

(21) Appl. No.: 18/099,937

(22) Filed: Jan. 21, 2023

(65) Prior Publication Data

US 2023/0260006 A1 Aug. 17, 2023

(30) Foreign Application Priority Data

Jan. 25, 2022 (KR) ........................ 10-2022-0010828

(51) Int. Cl.
*G06Q 30/00* (2023.01)
*G06Q 30/0601* (2023.01)

(52) U.S. Cl.
CPC ..... *G06Q 30/0631* (2013.01); *G06Q 30/0629* (2013.01); *G06Q 30/0643* (2013.01)

(58) Field of Classification Search
None
See application file for complete search history.

(56) References Cited

U.S. PATENT DOCUMENTS 11,403,697 B1 * 8/2022 Wu ..................... G06F 3/04812
2018/0012110 A1 1/2018 Souche et al.
2018/0276473 A1 * 9/2018 Kim ..................... G06V 10/235
2021/0390607 A1 * 12/2021 Jung ...................... G06Q 30/02
(Continued)

FOREIGN PATENT DOCUMENTS

JP 2001-52175 2/2001
JP 2009-251850 10/2009
(Continued)

OTHER PUBLICATIONS

Office Action for Korean Patent Application No. 10-2022-0010828 issued on Aug. 24, 2023 and its English translation by Global Dossier.

(Continued)

*Primary Examiner* — Mila Airapetian
(74) *Attorney, Agent, or Firm* — WOMBLE BOND DICKINSON (US) LLP

(57) ABSTRACT

A system for searching one or more images of goods includes a shopping mall server connected to a plurality of user terminals and configured to provide the user terminals with similar goods images matching a plurality of input goods images transmitted from the user terminals as a search result for recommended goods; and an input image analyzer communicationally connected with the shopping mall server and configured to receive information on the plurality of input goods images from the shopping mall server, calculate feature vectors corresponding to the input goods images, and transmit the calculated feature vectors to the shopping mall server. The shopping mall server includes a first database storing goods images for respective goods held by the shopping mall server and feature vectors corresponding to the goods images and a second database storing information on the goods images transmitted from the user terminal.

9 Claims, 11 Drawing Sheets

(56) References Cited

U.S. PATENT DOCUMENTS

| | | | | |
|---|---|---|---|---|
| 2022/0207587 | A1* | 6/2022 | Yang | G06N 3/08 |
| 2023/0177581 | A1* | 6/2023 | Ren | G06Q 30/0282 705/26.7 |
| 2023/0289862 | A1* | 9/2023 | Yoo | G06Q 30/0629 |

FOREIGN PATENT DOCUMENTS

| | | |
|---|---|---|
| JP | 2013-50502 | 3/2013 |
| JP | 2017-220019 | 12/2017 |
| JP | 2020-135888 | 8/2020 |
| JP | 2022-501726 | 1/2022 |
| KR | 10-1768521 | 8/2017 |
| KR | 10-2020-0002332 | 1/2020 |
| KR | 10-2020-0045668 | 5/2020 |
| KR | 10-2020-0046924 | 5/2020 |
| KR | 10-2020-0103182 | 9/2020 |

OTHER PUBLICATIONS

Office Action for Korean Patent Application No. 10-2022-0010828 issued on Mar. 27, 2023 and its English translation by Google Translate.

Office Action for Japanese Patent Application No. 2023-006548 issued on Jan. 9, 2024 and its English translation by Global Dossier.

* cited by examiner

SYSTEM AND METHOD FOR SEARCHING IMAGE OF GOODS

CROSS-REFERENCE TO RELATED APPLICATION

The present application claims priority under 35 U.S.C. § 119(a) to Korean patent application number 10-2022-0010828 filed on Jan. 25, 2022, in the Korean Intellectual Property Office, the entire disclosure of which is incorporated by reference herein.

BACKGROUND

1. Technical Field

Some embodiments of the present disclosure generally relate to a shopping mall system, and more particularly, to a system for searching one or more images of goods receiving a plurality of images and providing similar goods images corresponding to the received input images as a search result for recommended goods, and a method thereof in a shopping mall system that provides an image search tool.

2. Related Art

With the rapid increase in Internet users, the number of consumers purchasing goods through online shopping malls is soaring rapidly as well. The goods purchase through online shopping malls has the advantage of being able to quickly and conveniently search and purchase desired goods at home or work without actually visiting offline stores.

The online shopping mall may provide consumers with various goods supplied through at least one or more goods suppliers online, but, in the case of goods purchase through the conventional online shopping mall, it is hard to buy goods by actually looking at the goods.

Particularly, in the case of goods such as apparel, the usage of online shopping malls may be somewhat lower than other goods due to the high demand of customers who want to check the design or size directly. Therefore, online shopping malls dealing with apparel goods need to provide various ways to select goods that are suitable for customers by reflecting customer requirements more actively than online shopping malls handling other goods.

More specifically, when a customer searches for goods through an online shopping mall, a user is in need of checking whether there are more goods similar to the selected certain goods in the shopping mall, but the technology is unsatisfactory to allow the user to conveniently check similar goods related to the desired goods over a huge stock existing in the online shopping mall, such that a solution is required therefor.

In addition, when searching for goods through the online shopping mall, it may be difficult to find the goods by conventional search methods (e.g., category, keyword search, etc.) because the user is unaware of the name of goods, such that it is necessary to introduce a technology that may solve such the problem.

In other words, when it comes to the field of technology, it is necessary to develop technology to improve the satisfaction of online customers, that is, users, by making the basic usability of the current online shopping mall convenient and providing a search method that is different from existing methods.

SUMMARY

Certain embodiments of the present disclosure may provide a system for searching one or more images of goods which is configured to provide recommended goods information, and a method thereof. For example, in an online shopping mall system that provides an image search tool, the system for searching one or more images of goods may be configured to vectorize a plurality of goods image data input by a user, extract a plurality of feature vectors by executing a deep learning algorithm, and compare and analyze the extracted feature vectors with feature vectors of the previously stored similar goods images, so as to provide optimal similar goods images matching the input image information of the user as search result information for recommended goods.

In order to achieve the above object, in accordance with an aspect of the present disclosure, there is provided a system for searching image goods including a shopping mall server to which a plurality of user terminals with an image goods search application installed are connected and which is configured to provide the user terminals with similar goods images matching a plurality of input goods images transmitted from the user terminals as search result information for recommended goods; and an input image analyzer which is configured to receive information on the plurality of input goods images from the shopping mall server by being linked with the shopping mall server, calculate feature vectors corresponding to the images, and transmit the calculated feature vectors to the shopping mall server, wherein the shopping mall server includes a first database in which goods images for respective goods held by the shopping mall server and feature vectors corresponding to the goods images are stored and a second database in which information on the goods images input and transmitted from the user terminal is stored.

The shopping mall server may be configured to compare and analyze feature vectors each corresponding to a first input goods image and a second input goods image input and transmitted through the image goods search application and feature vectors of similar goods images previously stored in the database so as to search for a plurality of similar goods images corresponding to combined information of the first and second input goods images.

The input image analyzer may include an input image receiver configured to receive first and second input goods images to be input as metadata; a deep learning algorithm executor configured to convert information on the transmitted first and second goods images into vector image data and execute a deep learning algorithm to analyze the information on the the first and second goods images, respectively; a feature vector extractor configured to extract feature vectors for each of the first and second input goods images analyzed through the deep learning algorithm executor; and a first and second feature vectors generator/provider configured to generate a first input image feature vector and a second input image feature vector based on the extracted feature vectors to provide the feature vectors to the shopping mall server.

The generated first and second input image feature vectors may be analyzed for each corresponding input goods image to be stored in the second database.

The shopping mall server may include a first and second input image feature vectors receiver configured to receive the first and second input image feature vectors generated and provided by the input image analyzer; a feature vector processor configured to perform operation processing on the received first and second input image feature vectors to generate an integrated feature vector; a similar goods searcher configured to search for similar goods images by comparing and analyzing the first and second input image feature vectors and/or the integrated feature vector and the feature vectors of similar goods images previously stored in the first database; and a search result provider configured to output the similar goods images searched through the similar goods searcher to the user terminal as a search result for recommended goods.

The integrated feature vector may be a value generated by arithmetically averaging the first input image feature vector and the second input image feature vector that are matching each other.

The similar goods searcher may be configured to compare and analyze the integrated feature vector and the feature vectors of the similar goods images previously stored in the first database using a vector similarity search technique, so as to detect feature vectors stored in the first database similar to the integrated feature vector thereby.

The similar goods searcher may be configured to compare and analyze the first and second input image feature vectors and the feature vectors of the similar goods images previously stored in the first database using a vector similarity search technique, so as to detect first feature vectors stored in the first database similar to the first input image feature vector and second feature vectors stored in the first database similar to the second input image feature vector thereby.

The search result provider may be configured to output, to the user terminal as the search result for recommended goods, similar goods images overlapping each other among first similar goods images corresponding to the first feature vectors and second similar goods images corresponding to the second feature vectors searched through the similar goods searcher.

The similar goods images as the search result for a recommended goods displayed on the user terminal may be displayed in order of distance between the first and second input image feature vectors and/or the integrated feature vector and the feature vectors of the searched similar goods images.

In accordance with another aspect of the present disclosure, there is provided a method of searching image goods including receiving first input goods image and second input goods image that are input and transmitted through an image goods search application installed in a user terminal; converting information on the received first and second goods image into vector image data and executing a deep learning algorithm to analyze the information on the first and second goods images, respectively; extracting feature vectors for each of the first and second input goods images and generating a first input image feature vector and a second input image feature vector based on the extracted feature vectors; receiving the generated first and second input image feature vectors; generating an integrated feature vector by performing operation processing on the received first and second input image feature vectors; searching for similar goods images by comparing and analyzing the first and second input image feature vectors and/or the integrated feature vector with feature vectors of similar goods images previously stored in a first database; and outputting the searched similar goods images to the user terminal as a search result for recommended goods.

The integrated feature vector may be a value generated by arithmetically averaging the first input image feature vector and the second input image feature vector that are matching each other.

The searching for similar goods images may include comparing and analyzing the integrated feature vector and the feature vectors of the similar goods images previously stored in the first database using a vector similarity search technique, so as to detect feature vectors stored in the first database similar to the integrated feature vector thereby.

The searching for similar goods images may include comparing and analyzing the first and second input image feature vectors and the feature vectors of the similar goods images previously stored in the first database using a vector similarity search technique, so as to detect first feature vectors stored in the first database similar to the first input image feature vector and second feature vectors stored in the first database similar to the second input image feature vector thereby.

The outputting of the search result to the user terminal may include outputting similar goods images overlapping each other, among first similar goods images corresponding to the first feature vectors and second similar goods images corresponding to the second feature vectors, to the user terminal as the search result for recommended goods.

The outputting of the search result to the user terminal may include outputting a sum of similar goods images overlapping each other among first similar goods images corresponding to the first feature vectors and second similar goods images corresponding to the second feature vectors and third similar goods images corresponding to the feature vectors similar to the integrated feature vector to the user terminal as the search result for recommended goods.

The similar goods images as the search result for recommended goods displayed on the user terminal may be displayed in order of distance between the first and second input image feature vectors and/or the integrated feature vector and the feature vectors of the searched similar goods images.

In accordance with an embodiment of the present disclosure, by analyzing each of a plurality of goods images input by the user and providing optimal similar goods images matching input image information of the user as search result information for recommended goods through comparison and analysis on feature vectors of the previously stored similar goods images by calculating feature vectors corresponding thereto, it is possible to easily, quickly and accurately find similar goods corresponding to the goods which the user wants by a different search method with less computing resources even when the user has trouble finding the desired goods by conventional search methods (e.g., category, keyword search, etc.) because the user is unaware of the name of the goods.

In addition, it is also possible to make basic usability on the online shopping malls user convenient thereby while enhancing competitiveness of shopping malls by providing a search method that is different from conventional methods.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

Figure 1:
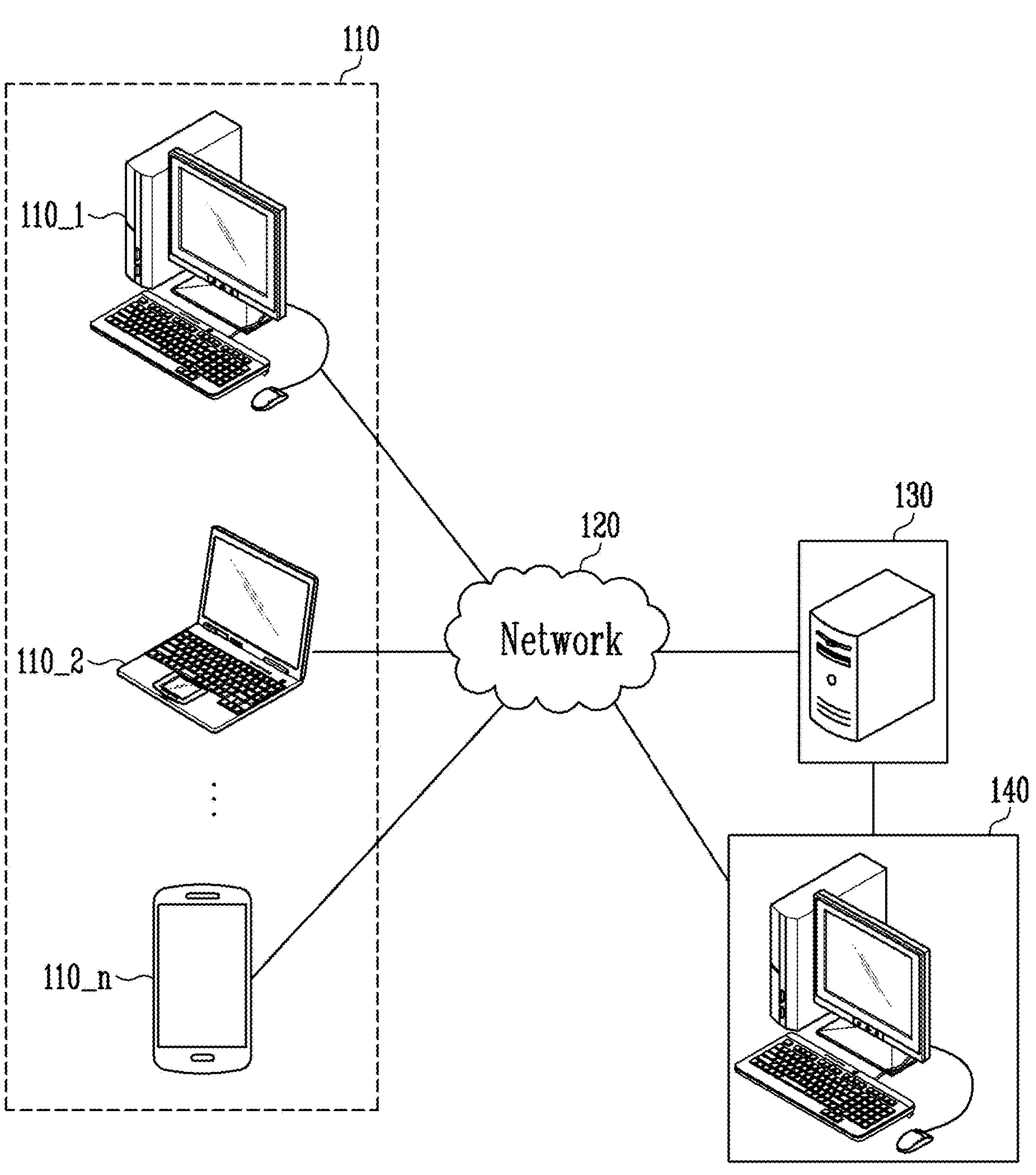
FIG. 1 illustrates a block diagram showing a network environment including a system for searching image goods in accordance with an embodiment of the present disclosure.

The contents described in the description column behind the above disclosure are only intended to help the understanding of the background art of the technical spirit of the present disclosure, and thus it cannot be understood as the content pertaining to a prior art known to those skilled in the art of the present disclosure.

In the description below, for illustrative purposes, many specific details are presented to help the understanding of various embodiments. However, it is apparent that various embodiments may be implemented without these specific details or in one or more equivalent manners. In other examples, well-known structures and devices are represented as block diagrams to avoid making it unnecessarily difficult to understand the various embodiments.

Each block in the attached block diagram may be performed by computer program instructions (execution engines), and these computer program instructions may be mounted onto a processor of a general purpose computer, special purpose computer, or other programmable data processing equipment, such that the instructions performed by the processor of the computer or other programmable data processing equipment generate means for performing the functions described in each block of the block diagram.

Since these computer program instructions may be stored in computer-available or computer-readable memory that may be directed to a computer or other programmable data processing equipment to implement the function in a particular manner, instructions stored in the computer-available or computer-readable memory may produce manufacturing items that incorporate instruction means for performing the functions described in each block of the block diagram.

In addition, since the computer program instructions may be mounted onto a computer or other programmable data processing equipment, a series of operating steps are performed on the computer or other programmable data processing equipment to generate a process that is executed by a computer, such that the instructions operating the computer or other programmable data processing equipment may provide the function for executing the functions described in each block of the block diagram.

In addition, each block may represent a part of module, segment, or code that includes one or more executable instructions for executing specified logical functions, and in some alternative embodiments, the functions mentioned in the blocks or steps may occur out of order.

In other words, two blocks shown may in fact be performed substantially at the same time, and it is also possible for the blocks to be performed in reverse order of corresponding functions as needed.

The terms used herein are for describing specific embodiments, not intended to limiting. Throughout the specification, when a part "includes" a certain component, it means that it may further include other components rather than excluding the other components, unless specifically stated to the contrary. Unless otherwise defined, the terms used herein have the same meaning as commonly understood by those skilled in the art to which the present disclosure pertains.

Hereinafter, with reference to the accompanying drawings, embodiments of the present disclosure will be described in more detail.

FIG. 1 illustrates a block diagram showing a network environment including a system for searching image goods (also referred to as an "image goods search system") in accordance with an embodiment of the present disclosure.

Referring to FIG. 1, the network environment including the image goods search system in accordance with an embodiment of the present disclosure includes a plurality of user terminals 110_1, 110_2, . . . , 110_*n*, a network 120, a shopping mall server 130, and an input image analyzer 140.

The user terminal 110 includes a mobile terminal that a user may carry. For example, the user terminal 110 may be a smartphone, tablet, laptop, and the like.

An image goods search application provided by the shopping mall server 130 may be installed in the user terminals 110, thereby obtaining various goods recommendation information provided by a goods recommendation shopping mall system in accordance with an embodiment of the present disclosure, that is, the shopping mall server 130 and the input image analyzer 140.

For example, when the user terminal 110 accesses the shopping mall server 130 to search for goods, a plurality of images of goods stored in the user terminal 110 or searched and captured by the user terminal 110 are transmitted to the shopping mall server 130 using the image search function of an application installed in the user terminal 110, and the shopping mall server 130 and the input image analyzer 140 may be configured to analyze the transmitted goods image information to provide goods recommendation information suitable for the user. The goods recommendation information may be information for recommending goods. In an embodiment of the present disclosure, the goods recommendation information may be provided as optimal similar goods images matching the plurality of goods images information input by the user.

More specifically, the shopping mall server 130 and the input image analyzer 140 may be configured to analyze a plurality of images of goods input by the user using the image search function of the image goods search application installed in the user terminal 110, and calculate feature vectors corresponding thereto, so as to provide optimal similar goods images matching input image information of the user through comparison and analysis on feature vectors of previously stored similar images of goods as search result information for recommended goods.

If the image goods search application is not installed in the user terminal 110, the user may download the application from the shopping mall server 130 to install the application in the terminal 110 of the user.

The network 120 may be implemented as a wireless communication network or a wired communication network. In this case, the communication method may not be limited and include not only a communication method utilizing a communication network (e.g., a mobile communication network, a wireless LAN network, wired Internet, a broadcasting network) that the network 120 may include, but also short-range wireless communication among devices.

The shopping mall server 130 can provide an online environment in which a plurality of user terminals 110 are allowed to access an interface provided by the shopping mall server 130 through the network 120 and search for various goods, for example, but not limited to, apparel goods, and consequently purchase goods which the user wants, and the shopping mall server 130 may be configured with at least one server device that is configured to provide commands, codes, files, contents, services, and the like.

In an embodiment of the present disclosure, the shopping mall server 130 is configured to provide optimal similar goods images matching the input image information of the user as search result information for recommended goods, through comparison and analysis on feature vectors for a plurality of goods images input through the image goods search application installed in the user terminal 110 and transmitted through the network 120 as mentioned above and feature vectors of the similar goods images previously stored in the database of the shopping mall server 130.

In addition, the image goods search system according to an embodiment of the present disclosure may include the input image analyzer 140 which is configured to receive the plurality of goods image information input from the shopping mall server 130, analyze each of the plurality of goods image information, calculate feature vectors corresponding thereto, and transmit the feature vectors to the shopping mall server 130.

Thereby, when the user terminal 110 accesses the shopping mall server 130 and searches for goods (e.g., apparel goods) provided by the shopping mall server 130, using the interface provided in the shopping mall server 130 and/or the application installed in the user terminal 110, it is possible to easily and accurately find similar goods corresponding to the goods which the user wants in a different search method even when the user has trouble finding the desired goods by existing search methods (e.g., category, keyword search, etc.) because the user is unaware of the name of goods. In addition, basic usability of the online shopping malls may become convenient for the users thereby, while enhancing competitiveness of shopping malls by providing a search method that is different from existing methods.

The input image analyzer 140 may be configured to vectorize the goods image information input by the user, analyze each of the plurality of goods image information by execution of a deep learning algorithm, and extract feature vectors corresponding thereto, such that the input image analyzer 140 may be configured to perform an operation of generating feature vectors for each of the input goods image information.

FIG. 1 describes, as an example, that the input image analyzer 140 is configured separately from the shopping mall server 130, but alternatively, the input image analyzer 140 and the shopping mall server 130 may be implemented as a single device.

The shopping mall server 130 may be implemented in the form of a web server which refers to a computer system and computer software (web server programs) installed therefor that is generally connected to an unspecified number of clients and/or other servers through an open computer network such as the Internet and configured to receive operation execution requests of the client or other web server and provide derived operation results thereby. However, in addition to the above-described web server program, it may be understood as a broad concept including a series of application programs operating on the web server and, in some cases, various databases built therein. For example, the shopping mall server 130 may be implemented using a web server program variously provided in general server hardware depending on an operating system such as DOS, Windows, Linux, Unix, Macintosh, etc., examples of which are websites and Internet Information Server (IIS) used in the Windows environment as well as CERN, NCSA, APPACH, etc. used in the Unix environment.

Figure 2:
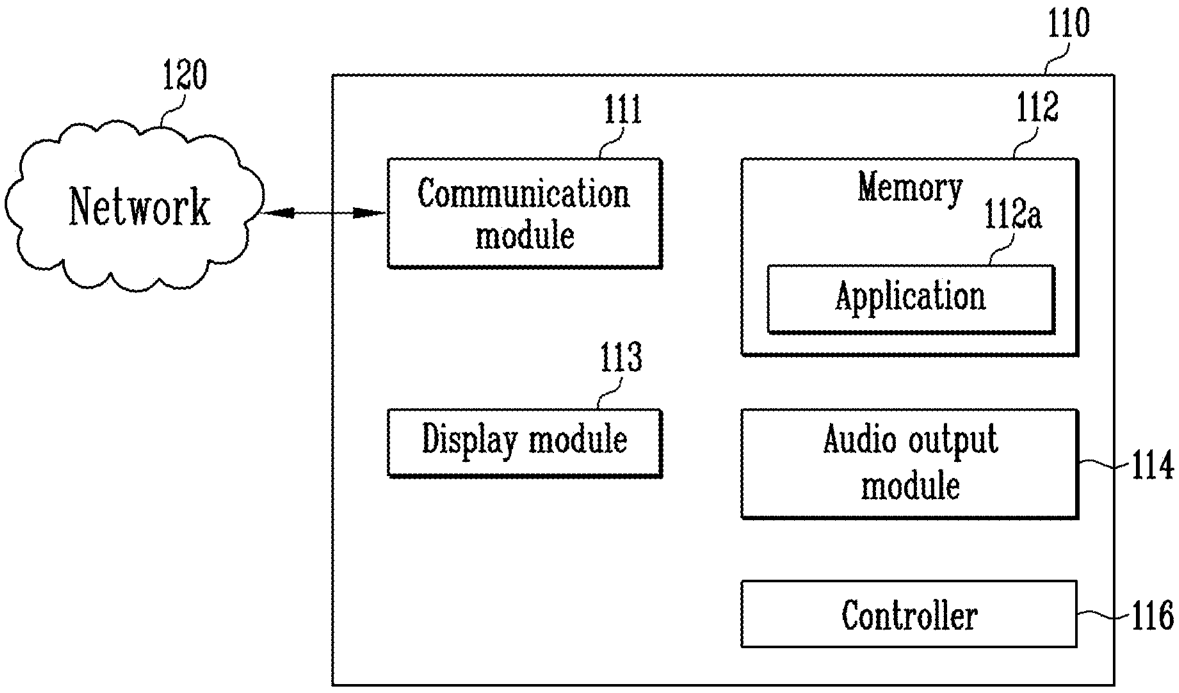
FIG. 2 illustrates a block diagram showing a configuration of a user terminal shown in FIG. 1.

FIG. 2 illustrates a block diagram showing a configuration of the user terminal shown in FIG. 1.

Referring to FIG. 2, each user terminal 110 may include a communication module 111, a memory 112, a display module 113, an audio output module 114, and a controller 116.

The communication module 111 may be connected to communicate with any internal component or at least one external device through the network 120. In this case, any external device may include, for example, but not limited to, the shopping mall server 130 and/or the input image analyzer 140 shown in FIG. 1. Here, wireless Internet technologies include wireless LAN (WLAN), Digital Living Network Alliance (DLNA), wireless broadband (Wibro), World Interoperability for Microwave Access (Wimax), High Speed Downlink Packet Access (HSDPA), High Speed Uplink Packet Access (HSUPA), IEEE 802.16, Long Term Evolution (LTE), Long Term Evolution-Advanced (LTE-A), wireless mobile broadband service (WMBS), etc. The communication module 111 is configured to transmit and receive data according to at least one wireless Internet technology in a range including Internet technologies not listed above.

In addition, short-range communication technologies may include Bluetooth, Radio Frequency Identification (RFID), Infrared Data Association (IrDA), ultra wideband (UWB), ZigBee, near field communication (NFC), ultra sound communication (USC), visible light communication (VLC), Wi-Fi, Wi-Fi Direct, and the like.

The memory 112 is configured to store various user interfaces (UIs), graphic user interfaces (GUI), and the like. In addition, the memory 112 is configured to store data and programs required for the user terminal 110 to operate. In other words, the memory 112 may be configured to store a plurality of application programs (hereinafter referred to as 'applications') running in the user terminal 110, data for operation of the user terminal 110, and commands. In other words, at least one or more applications are stored in the memory 112 in the user terminal 110 in accordance with an embodiment of the present disclosure. At least some of these applications may be downloaded from an external server via wireless communication. The application according to an embodiment of the present disclosure includes an image goods search application 112*a* provided by the shopping mall server 130 shown in FIG. 1.

In addition, the applications may be implemented as Automatic Speech Recognition (ASR) applications, map applications, media applications (e.g., QuickTime, MobileMusic.app, or MobileVideo.app), social networking applications (e.g., Facebook, Twitter, etc.), Internet browsing applications, and the like. Meanwhile, the applications may be stored in the memory 112 and installed in the user terminal 110 so as to run to perform an operation (or a function) of the user terminal 110 by the controller 116.

In addition, the memory 112 may include at least one storage medium of Flash Memory Type, Hard Disk Type, Multimedia Card Micro Type, a card type memory (e.g., SD or XD memory, etc.), a magnetic memory, a magnetic disk, an optical disk, a Random Access Memory (RAM), a Static Random Access Memory (SRAM), a Read-Only Memory (ROM), an Electrically Erasable Programmable Read-Only Memory (EEPROM), and Programmable Read-Only Memory (PROM).

The display module (or display) 113 may be configured to display various contents such as various menu screens using a user interface and/or a graphic user interface stored in the memory 112 by the control of the controller 116 and display the execution result screen of the image goods search application 112*a* executed by the control of the controller 116.

For example, when the image goods search application 112*a* is executed, the display module 113 may be configured to display an image input window (or interface) provided by the image goods search application 112*a* on the screen, and the user may input the goods image previously stored in the memory 112 or goods image data captured by the user through Social Network Service (SNS), Internet surfing, and the like by means of the image input window.

Here, the content displayed on the display module 113 may include various text or image data (including various information data) as well as icons, and menu screens showing list menus and the like. The display module 113 may be implemented as a liquid crystal display (LCD), an organic light-emitting diode (OLED), a flexible display, a 3D display, an e-ink display, a light emitting diode (LED), and the like.

The audio output module 114 may be configured to output voice or audio information included in a certain signal-processed signal by the control of the controller 116. Here, the audio output module 114 may include a receiver, a speaker, and the like.

Figure 3:
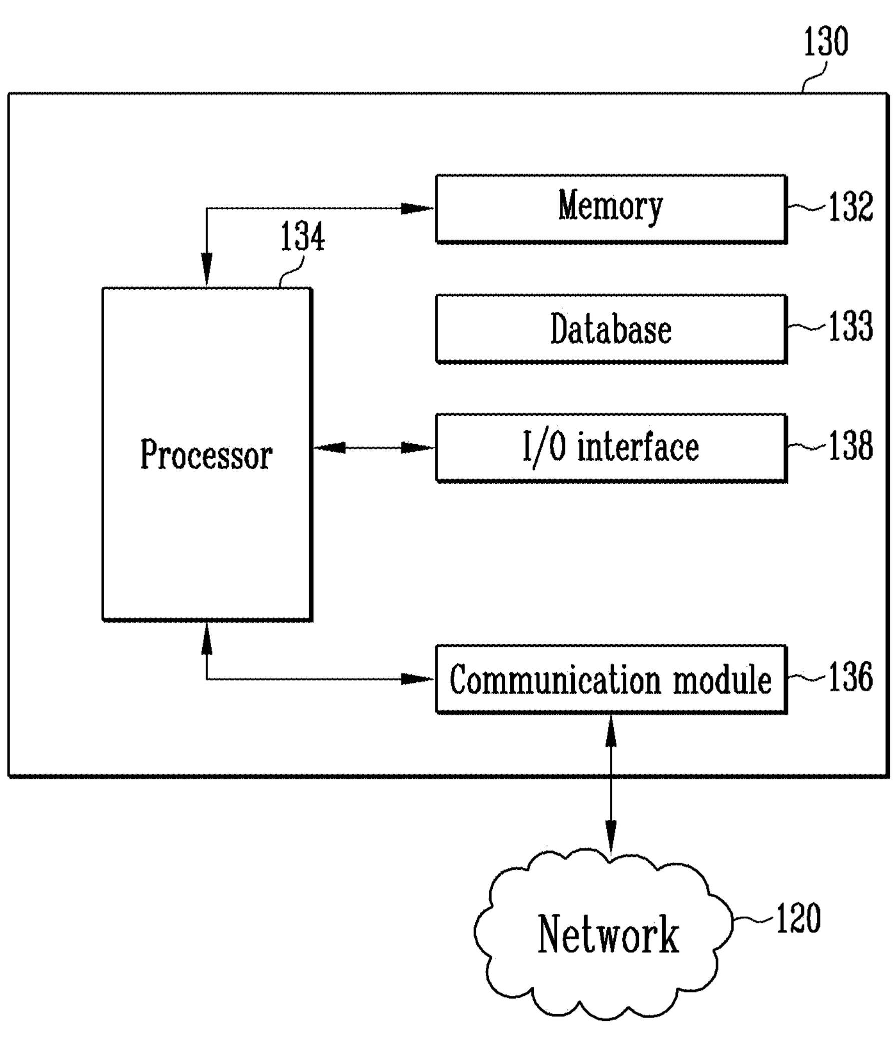
FIG. 3 illustrates a block diagram schematically showing an embodiment of an internal configuration of a shopping mall server shown in FIG. 1.

FIG. 3 illustrates a block diagram schematically showing an embodiment of an internal configuration of the shopping mall server shown in FIG. 1.

Referring to FIG. 3, the shopping mall server 130 includes a memory 132, a database 133, a processor 134, a communication module 136, and an Input/Output (I/O) interface 138.

The memory 132, which is a computer-readable recording medium, may include non-extinguishable mass recording devices such as RAM, ROM, and disk drives. In addition, in the memory 132, an operating system and at least one program code may be stored. Such software components may be loaded from a computer-readable recording medium separate from the memory 132 using a drive mechanism. Such the separate computer-readable recording medium may include recording media such as floppy drives, disks, tapes, DVD/CD-ROM drives, memory cards, and the like. In addition, the software components may be loaded into the memory 132 through the communication module 136.

Figure 4:
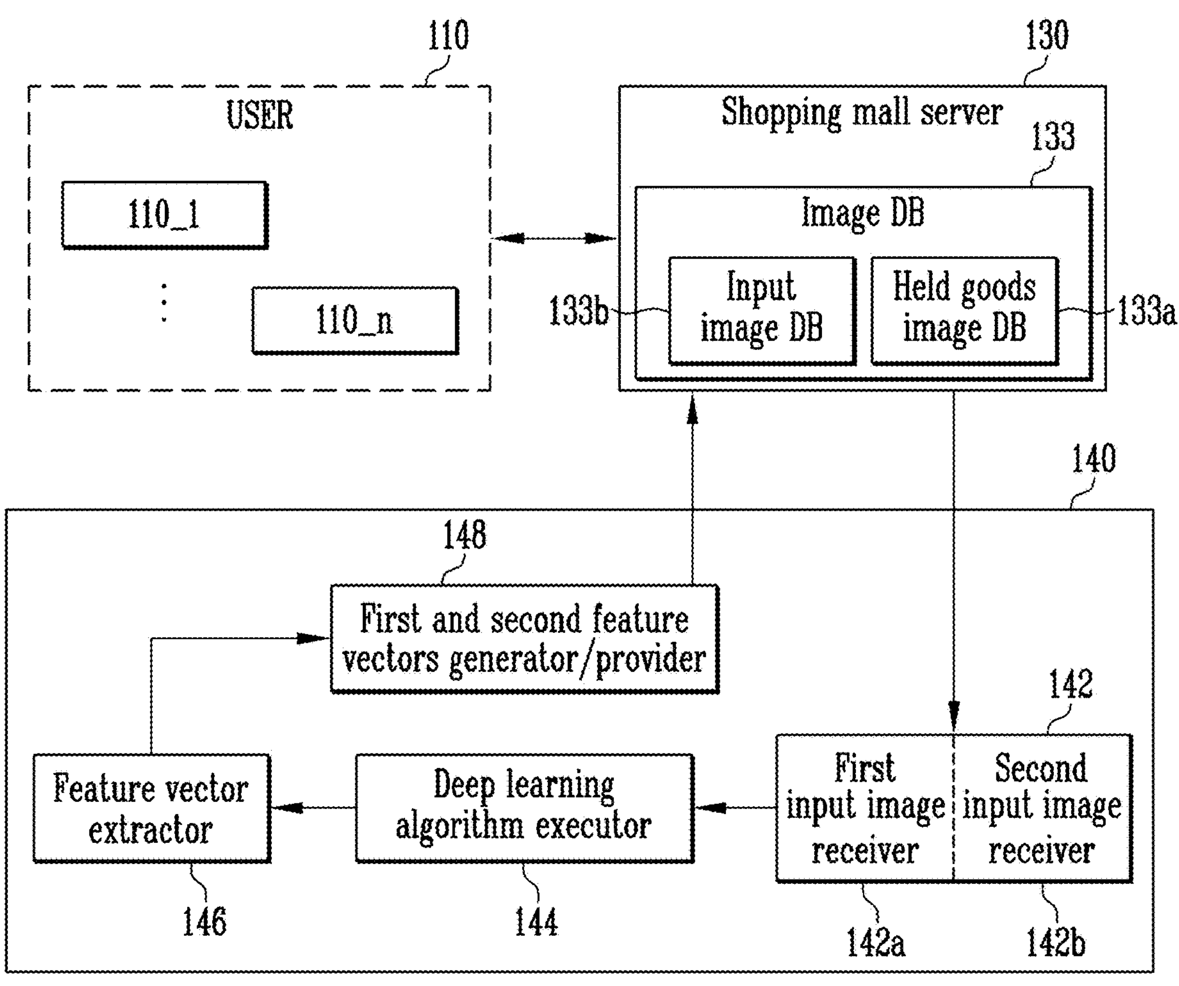
FIG. 4 illustrates a block diagram showing a configuration of an input image analyzer in accordance with an embodiment of the present disclosure.

The database 133 may be configured to store and hold information transmitted and received from the user terminals 110 connected to the shopping mall server 130 in accordance with an embodiment of the present disclosure. In addition, the database 133 may be configured to store, as an image database, image information on goods held by the shopping mall server 130 and goods image information input and transmitted from the user terminal 110. For example, as shown in FIG. 4, the image database 133 may include a first database 133*a* in which goods images for each goods held by the shopping mall server 130 are stored and a second database 133*b* in which goods image information input and transmitted from the user terminal 110 is stored.

The processor 134 may be configured to process algorithms, instructions or commands of a computer program by performing basic arithmetic, logic, and I/O operation. The algorithms, instructions or commands may be provided to the processor 134 by the memory 132 or the communication module 136. For example, processor 134 may be configured to execute commands received according to program code stored in a recording device such as the memory 132. In other words, the processor 134 may include a program module that is implemented by a computer programing language such as C, C++, Java, Visual Basic, Visual C, and the like as software to perform various functions.

The shopping mall server 130 is configured to allow the plurality of user terminals 110 to access an interface provided by the shopping mall server 130 through the network 120 to search for various goods (e.g., apparel goods), so as to provide an online environment in which the user may purchase the desired goods.

The shopping mall server 130 in accordance with an embodiment of the present disclosure may be configured to provide optimal similar goods images matching input image information of the user as search result information for recommended goods, through comparison and analysis on feature vectors for a plurality of goods images input through the image goods search application 112*a* installed in the user terminal 110 and transmitted through the network 120 as mentioned above and feature vectors of the similar goods images previously stored in the database of the shopping mall server 130.

In addition, the input image analyzer 140 in accordance with an embodiment of the present disclosure may be configured to perform one or more operations of receiving the plurality of goods image information input from the shopping mall server 130, analyzing the plurality of goods image information respectively by executing a deep learning algorithm, calculating feature vectors corresponding thereto, and transmitting the feature vectors to the shopping mall server 130.

The configuration and operation of the shopping mall server 130 and the input image analyzer 140 in accordance with exemplary embodiments of the present disclosure will be described in more detail through FIGS. 4 to 11 below.

The communication module 136 may be configured to provide a function for communicating with each other between the user terminals 110 and the shopping mall server 130 through the network 120. For example, control signals, commands, contents, files, etc. provided under the control of the processor 134 of the shopping mall server 130 may be transmitted to the user terminals 110 through the network 120 by means of the communication module 136.

The I/O interface 138 may be configured to provide an interface between an input device implemented as a keyboard, mouse, touch panel or microphone and an output device such as a display or speaker.

FIG. 4 illustrates a block diagram showing a configuration of the input image analyzer in accordance with an embodiment of the present disclosure.

The input image analyzer 140 in accordance with an embodiment of the present disclosure may be configured to perform an operation of receiving the plurality of goods image information input from the shopping mall server 130, analyzing the plurality of goods image information respectively by executing a deep learning algorithm, generating feature vectors for each of the input goods image information through extraction of feature vectors corresponding thereto, and transmitting the feature vectors to the shopping mall server 130.

In an embodiment shown in FIG. 4, the input goods image information is described as an example in which there are two images including a first goods image and a second goods image, but it is for convenience of description, and the embodiments of the present disclosure are not necessarily limited thereto.

Referring to FIG. 4, the input image analyzer 140 includes an input image receiver 142, a deep learning algorithm executor 144, a feature vector extractor 146, and a first and second feature vectors generator/provider 148. In addition, the input image analyzer 140 may be linked or connected with the database 133 of the shopping mall server 130.

The database 133 may be configured to store image information on goods held by the shopping mall server 130 and the input goods image information. For example, as shown in FIG. 4, the image database 133 may include the first database 133*a* in which goods images for each goods held by the shopping mall server 130 are stored and the second database 133*b* in which goods image information input and transmitted from the user terminal 110 is stored. In an embodiment of the present disclosure, the input image analyzer 140 may be linked or connected with the second database 133*b* of the image database 133.

The input image analyzer 140 shown in FIG. 4 may be implemented as one or more processors, controllers, or computers, wherein it may be understood that each of the input image receiver 142, the deep learning algorithm executor 144, the feature vector extractor 145, and the first and second feature vectors generator/provider 148 which are components of the input image analyzer 140 is expressed by distinguishing each different functions performed by the processor, controller or computer. At this time, the processor may be implemented as a separate processor distinguished from the processor 134 included in the shopping mall server 130 as mentioned above, but embodiments of the present disclosure are not limited thereto. In other words, each component of the input image analyzer 140 may be functional blocks or a set of instructions or algorithms implemented in the processor 134 of the shopping mall server 130.

The input image receiver 142 may be configured to perform an operation of receiving first and second goods image information input through the user terminal 110 and provided by the shopping mall server 130. For example, the input image receiver 142 may include a first input image receiver 142*a* configured to receive the first goods image information and a second input image receiver 142*b* configured to receive the second goods image information.

In other words, the input image receiver 142 may be configured to be input with the first and second goods image information as metadata, and the goods image information as the input metadata is transmitted to the deep learning algorithm executor 144.

The deep learning algorithm executor 144 may be configured to perform an operation of converting the transmitted first and second goods image information into vector image data. As an embodiment, the vector image data may be data generated by a graphical method representing an image by describing geometric information in mathematical coordinates, and, unlike raster images that may be implemented in graphic file formats such as Bitmap, Jpeg, and Gif representing images with color information for each pixel, the quality of an original image may be preserved as it is without errors such as cracking or stair effects occurring when zooming in/out in order to express very detailed parts. For example, the vector image formats include Adobe Illustrator (AI), Scalable Vector Graphics (SVG), Vector Markup Language (VML), Computer Graphics Metafile (CGM), Gerber format, and the like.

In addition, the deep learning algorithm executor 144 may be configured to perform an operation of executing the deep learning algorithm to analyze the plurality of goods image information, respectively. The deep learning algorithm in accordance with an embodiment of the present disclosure may target, for instance, but not limited to, fashion goods, and the operation thereof will be described schematically as follows.

The deep learning algorithm executor 144 may detect an object in the image by object detection of the input goods image, and may generate a bounding box based on the detected object. Here, the goods image may be an image or video of goods sold in the online shopping mall. More specifically, an object area may be recognized in the goods image, and an approximate area where the object is located may be cropped into a bounding box in the shape of a square box.

In addition, the deep learning algorithm executor 144 may be configured to perform fashion detection to the input goods image. The fashion detection may recognize an object related to fashion and an area occupied by the object and crop a bounding box for each fashion object. To this end, the deep learning algorithm executor 144 may include a fashion detection part (not shown) which may include a first convolution neural network Conv 1 configured to pass the input goods image through a convolution layer at least once and a second convolution neural network Conv 2 comprising a Region of Interest (RoI) pulling layer, a soft max, and a bounding box regressor.

The first convolution neural network Conv 1 may be configured to simultaneously accept or receive the entire image and an object candidate area as input, and a first convolution network may be configured to process the entire image at once through the convolution layer and a max-pooling layer so as to generate a feature map showing feature areas by grouping meaningful objects.

Next, a second convolution network may be configured to pass a RoI pooling layer for each object candidate area to extract a fixed-length feature vector from the feature map.

The feature vector may refer to a variable specifying features for an object on each input goods image. In addition, the second convolution network may be configured to apply the extracted feature vector to a fully-connected layer (FCs) and then apply output data of the fully-connected layer to the softmax disposed at the final stage to specify the type of each object.

At this time, the second convolution network may be learned to extract only fashion-related objects among the types of objects. In addition, the second convolution network may be configured to apply output data of the fully-connected layer to the bounding box regressor (bbox regressor) to extract a bounding box schematically representing an area occupied by the fashion-related object. The fashion detection part comprising the first convolution network and the second convolution network may be configured to specify that the type of object is a fashion-related goods image and extract the feature area occupied by the goods image into the bounding box.

As a result, information on each of the first and second input goods images analyzed by the deep learning algorithm executor 144 is transmitted to the feature vector extractor 146, and the feature vector extractor 146 may be configured to perform an operation of extracting feature vectors corresponding to each of the first and second input goods images.

Thereafter, feature vectors corresponding to each of the first and second input goods images in the feature vector extractor 146 may be transmitted to the first and second feature vectors generator/provider 148, and each feature vector information generated thereby may be analyzed for each input goods image to be stored in the second database 133*b* in which input goods image information is stored.

Figure 5:
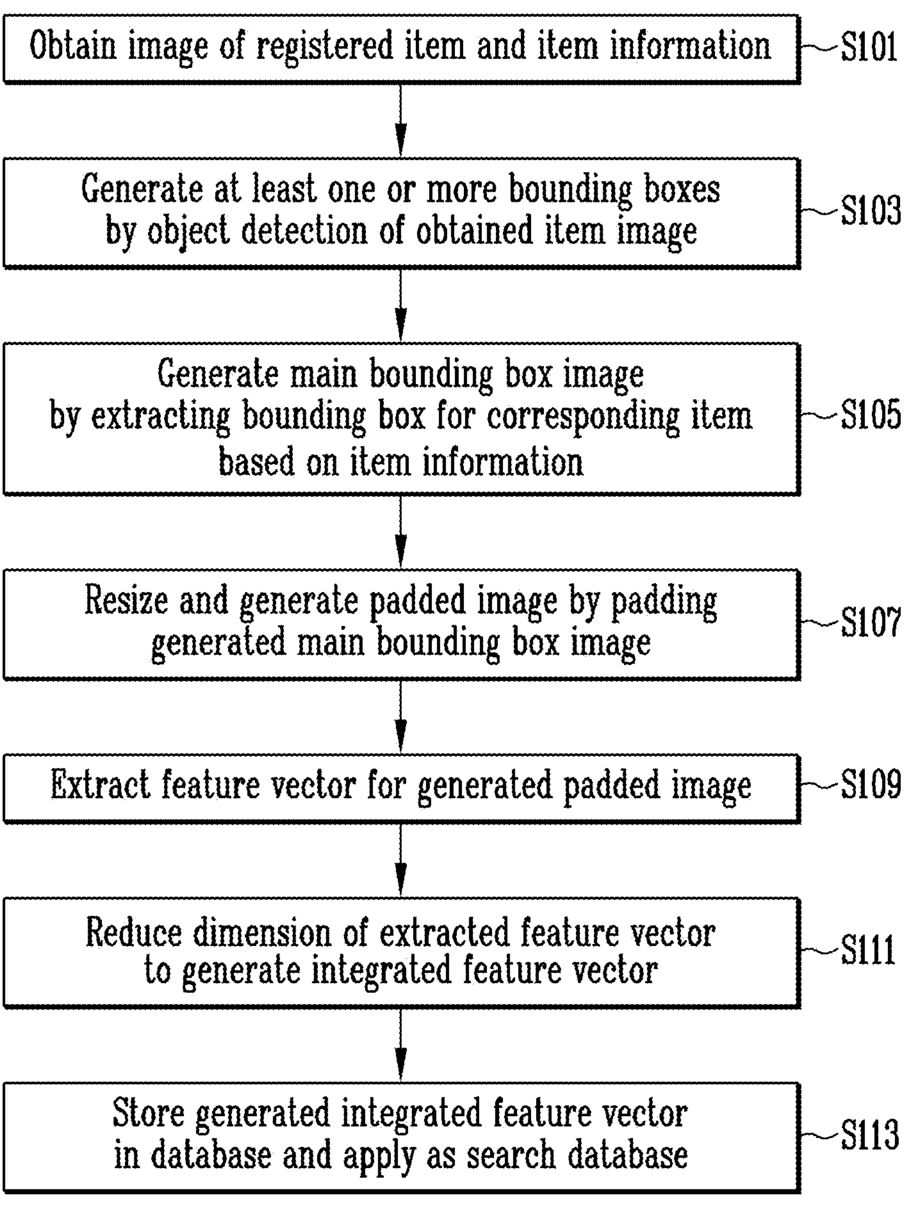
FIG. 5 illustrates a flowchart for showing a method of generating a database for providing similar goods based on deep learning in accordance with an embodiment of the present disclosure.
Figure 6:
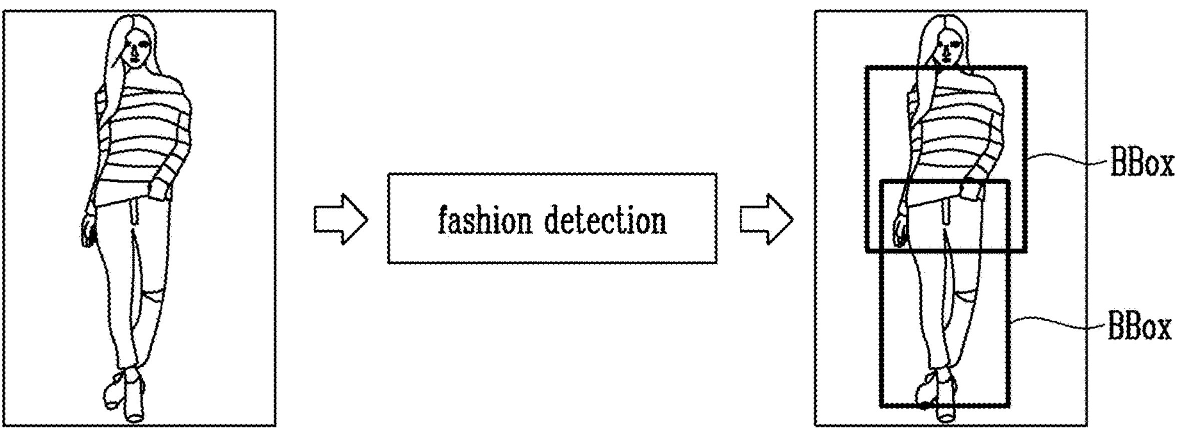
FIG. 6 illustrates a diagram for showing an example of generating a bounding box by object detection of an item image in accordance with an embodiment of the present disclosure.
Figure 7:
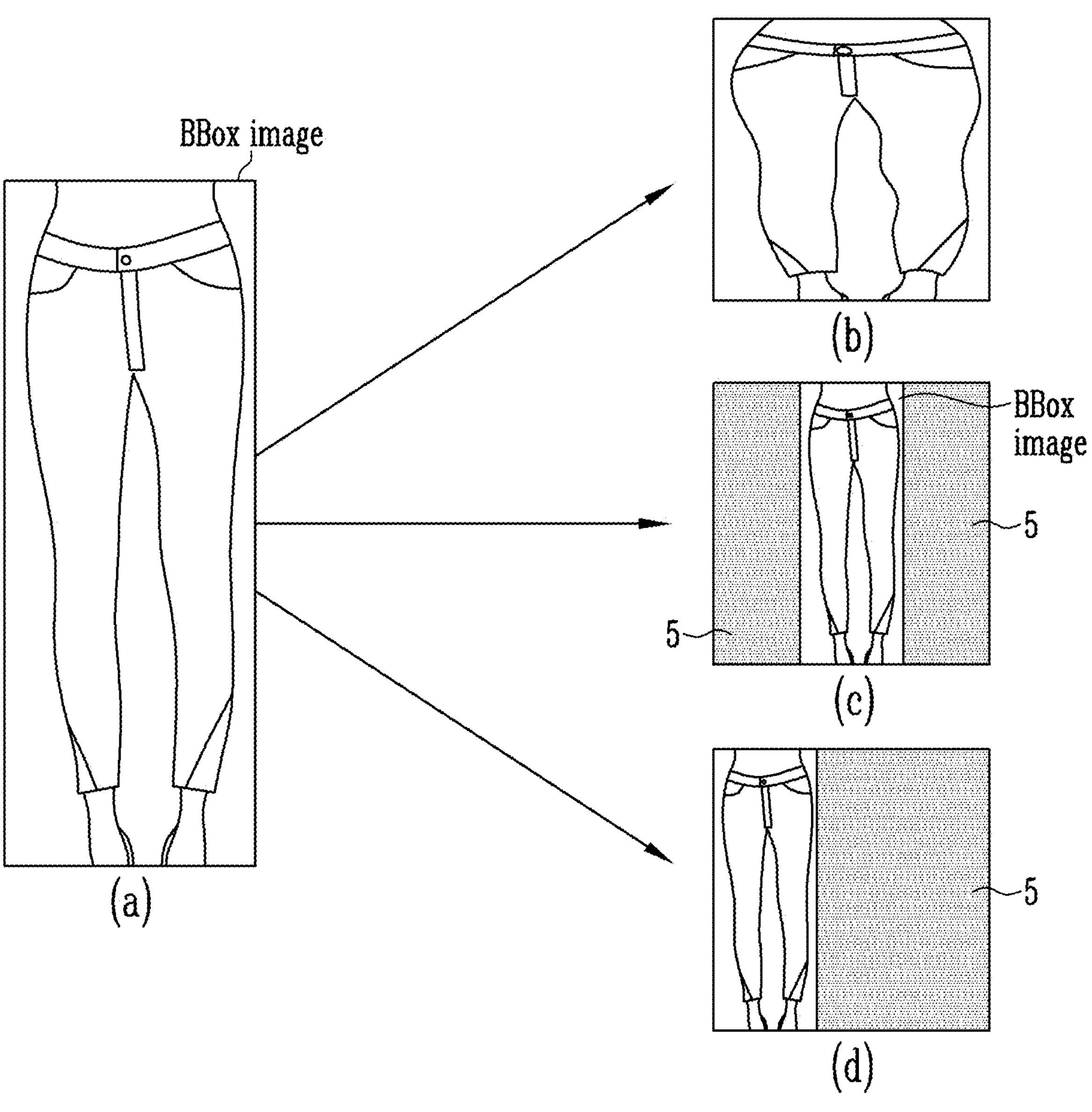
FIG. 7 illustrates a diagram for showing a process of generating a padded image in accordance with an embodiment of the present disclosure.

FIG. 5 illustrates a flowchart for showing a method of generating a database for providing a similar goods based on deep learning in accordance with an embodiment of the present disclosure, FIG. 6 illustrates a diagram for showing an example of generating a bounding box by object detection of an item image in accordance with an embodiment of the present disclosure, and FIG. 7 illustrates a diagram for showing a process of generating a padded image in accordance with an embodiment of the present disclosure.

The shopping mall server 130 and the input image analyzer 140 in accordance with an embodiment of the present disclosure may be configured to extract images for goods items posted in the online shopping mall and input goods images sent by the user, respectively, to generate a database for application as a database for searching for similar goods for specific goods items.

Referring to FIG. 5, images for goods items posted in the online shopping mall and/or input goods images sent by the user and goods item information corresponding thereto may be obtained (step S101). Here, the goods item refers to goods sold in an online shopping mall, and the goods item image to a video of goods sold in the shopping mall. In addition, the goods item information may include categories of items, that is, information on goods groups in which items such as tops, bottoms, swimwear, and/or dresses are classified.

Thereafter, the shopping mall server 130 and the input image analyzer 140 which obtained the goods item image and information at step S101 may generate at least one or more bounding boxes by object detection of the obtained item image (step S103). For example, referring to FIG. 6, the input image analyzer 140 may be configured to perform object detection for the obtained item image based on deep learning through an object detector, and at least one or more objects may be detected in the image. In addition, based on the detected object, at least one or more bounding boxes having an approximate area where the object is located in a square box shape may be extracted. In this case, the input image analyzer 140 may be configured to use the deep learning neural network by training the same to be optimized for a fashion item, the type of object on the item image may be specified as the fashion-related item through the trained neural network, and the feature area occupied by the item may be extracted in the bounding box. That is, the input image analyzer 140 may be configured to detect the fashion-related object in the item image and generate the bounding box including an image area representing the detected object. For example, using a fashion detector trained to be optimized for fashion items, at least one or more bounding box may be generated by object detection of the obtained item image. As described above, the input image analyzer 140 may be configured to perform data processing only on a fashion item image using deep learning, thereby providing an accurate and fast similar item provision service based on the neural network and big data.

Next, the shopping mall server 130 and the input image analyzer 140 which generated at least one or more bounding boxes for the item image at step S103 may determine the bounding box for the item based on the obtained item information and extract the image in the determined bounding box as a main bounding box image (step S105).

The shopping mall server 130 and the input image analyzer 140 may be configured to extract an image in the detected bounding box to generate as a main bounding box image. That is, the main bounding box image is an image in at least one or more bounding boxes representing the item among the plurality of bounding boxes generated from the item image. As an embodiment, the input image analyzer 140 may be configured to detect a bounding box including a top object matching the 'top' when the obtained item information is 'top', and extract the image in the bounding box including the detected top object as the main bounding box image. In addition, in an embodiment, the shopping mall server 130 and the input image analyzer 140 may be configured to merge, when the obtained item information indicates an item in which a top object and a bottom object form a set, such as 'bikini swimsuit' and/or 'two-piece', by extracting the bounding boxes including the top object and bottom object matching the item information together.

In addition, the shopping mall server 130 and the input image analyzer 140 may be configured to extract an image in the bounding box obtained by merging the bounding box of the top object and that of the bottom object as the main bounding box image.

As described above, the shopping mall server 130 and the input image analyzer 140 may be configured to generate a bounding box for a plurality of objects present on the item image, and detect only the bounding box including the item among the generated bounding boxes so as to extract only the area related to the item in the obtained item image, thereby reducing data processing load while enhancing search speed by providing a deep learning-based similar item search function based on the extracted area. In addition, the shopping mall server 130 and the input image analyzer 140 may be configured to extract at least one or more bounding boxes according to the obtained item information, and combine the extracted at least one or more bounding boxes to generate the main bounding box image representing the item, thereby providing a similar item provision service with higher accuracy for each category of item. Next, the shopping mall server 200 which generated the main bounding box image at step S105 may generate a padded image by padding the main bounding box image to adjust the size (step S107).

In general, the deep learning neural network configured to extract a feature vector for an image may be configured to receive only an image of a certain size as input data. However, the size of the main bounding box image may vary for each item, such that the size of the main bounding box image can be converted into a size suitable for the input to the deep learning neural network. In this case, if the size is converted without maintaining the existing aspect ratio of the original image, there may be a risk that the feature vector for the style or shape of the item may be distorted. Therefore, in an embodiment of the present disclosure, in order to input the main bounding box image to the deep learning neural network, padding processing may be performed to adjust the size of the main bounding box image while maintaining the existing aspect ratio.

Here, the padding processing refers to image processing to add a pad image to adjust the size while maintaining the aspect ratio of the original image. In this case, the pad image may refer to an image inserted into both sides or one side of the original image by being generated to fit the insufficient size when the size at one side is smaller than the input size in the original image that is resized while the aspect ratio is maintained, without affecting the deep leaning. For example, the pad image may be an image consisting of grayscale monochromatic colors.

In other words, the shopping mall server 130 and the input image analyzer 140 in accordance with an embodiment of the present disclosure may be configured to add a pad image onto the main bounding box image adjusted to a predetermined size through the padding processing so as to adjust the main bounding box image to fit the input size of the deep learning neural network for feature vector extraction. In detail, referring to FIG. 7, in the shopping mall server 130 and the input image analyzer 140, in order to use the generated main bounding box image (a) as input data of the deep learning neural network which is configured to extract a feature vector, the shape of the item may be distorted in a first image (b) generated by changing the horizontal and/or vertical size of the image according to the preset limit size. In order to avoid such distortion, the shopping mall server 200 may be configured to reduce the horizontal size of the main bounding box image while maintaining the aspect ratio according to the horizontal size of the input data. Next, the shopping mall server 200 may be configured to, in order to adjust the vertical size of the main bounding box image to that of the input data, add a pad image 5 to both sides of the main bounding box image to generate a first padded image (c).

Alternatively, the shopping mall server 130 and the input image analyzer 140 may be configured to, in order to adjust the vertical size of the main bounding box image to that of the input data, add a pad image 5 to one side of the main bounding box image to generate a second padded image (d). In other words, the shopping mall server 130 and the input image analyzer 140 may be configured to perform padding processing to add the pad image 5 generated in a predetermined size to one or both sides of the resized main bounding box image to generate a padded image.

Through such the padding processing, the shopping mall server 130 and the input image analyzer 140 may be configured to generate the padded image which includes a size-adjusted main bounding box image and the pad image 5, while maintaining the aspect ratio intact as that of the original image. As described above, by having the aspect ratio of the original image maintained even after resizing the image through padding processing, the shopping mall server 130 and the input image analyzer 140 may be configured to convert the original image to fit the input data size of the deep learning neural network while avoiding distortion of the item shape.

Next, the shopping mall server 130 and the input image analyzer 140 which generated the padded image at step S105 may be configured to extract a feature vector for the generated padded image (step S109). More specifically, the shopping mall server 130 and the input image analyzer 140 may be configured to input the generated padded image to the deep learning neural network for extracting feature vectors, so as to extract a feature vector that specifies a feature of an object on the image.

In this case, the shopping mall server 130 and the input image analyzer 140 may be configured to use the deep learning neural network for extracting feature vectors by training the deep learning neural network to be optimized for feature extraction for items used in fashion.

As described above, in the shopping mall server 130 and the input image analyzer 140, by extracting the feature vector for the padded image including an item object using the deep learning neural network, it is possible to obtain data capable of more effectively specifying and managing the features of the item, thereby facilitating a service provided by detecting similar items based on deep learning.

Next, the shopping mall server 130 and the input image analyzer 140 which extracted the feature vector for the padded image at step S109 may be configured to reduce the dimension of the extracted feature vector to generate an integrated feature vector (step S111). In this case, the dimension of the feature vector may vary depending on a method of deep learning used to extract the feature vector. In an embodiment, the dimension of the feature vector may be proportional to the number of parameters from which the feature vector is to be extracted. For example, when the shopping mall server 200 extracts a feature vector for each parameter based on a texture, fabric, shape, style, and color parameters, the dimension of the feature vector may be 5D. The dimension of such feature vector may be burdensome to be stored in the database 133 as the size of the dimension becomes large, and the time required to perform search in the database 133 may also increase. Accordingly, in an embodiment of the present disclosure, the shopping mall server 130 and the input image analyzer 140 may be configured to generate an integrated feature vector in which the dimension of the extracted feature vector is reduced through various algorithms.

More specifically, as an embodiment, the shopping mall server 130 and the input image analyzer 140 may be configured to reduce the dimension of the extracted feature vector using at least one of Principle Component Analysis (PCA), Independent Component Analysis (ICA), non-negative matrix factorization, and Singular Value Decomposition (SVD) techniques, thereby generating the integrated feature vector.

For example, the shopping mall server 130 and the input image analyzer 140 may be configured to reduce the dimension by integrating the extracted parameter-specific feature vectors into a predetermined algorithm to generate the integrated feature vector. As such, the shopping mall server 130 and the input image analyzer 140 may be configured to perform data processing to reduce the dimension of the feature vector extracted from the padded image, thereby more efficiently forming database for the feature vector while reducing time and cost required for subsequently searching for similar items in the database 133.

Next, the shopping mall server 130 and the input image analyzer 140 which generated the integrated feature vector at step S111 may be configured to store the generated integrated feature vector in the database 133, and the database 133 may be used later as a search database for searching for similar items (step S113).

Hereinafter, through FIGS. 8 to 11, described in detail are the shopping mall system and a method therefor, the shopping mall system configured to recommend goods suitable for a customer automatically generates a goods exhibition interface in accordance with an embodiment of the present disclosure.

Figure 8:
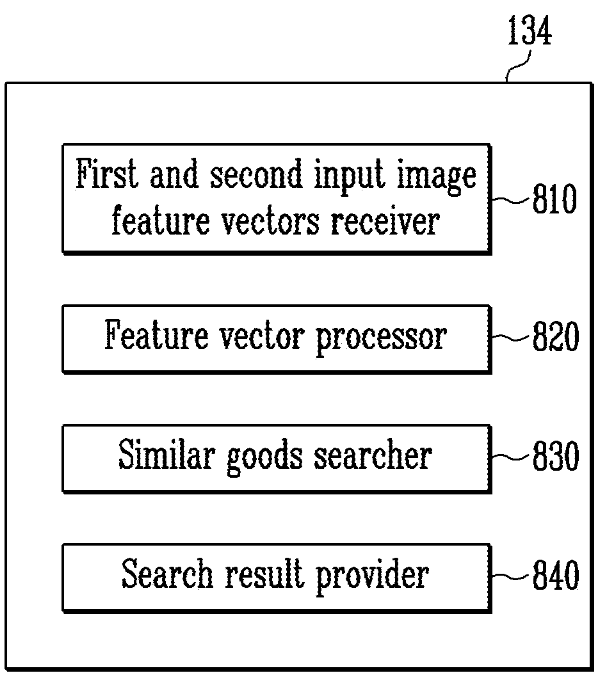
FIG. 8 illustrates a block diagram illustrating an embodiment of an internal configuration of a processor of a shopping mall server shown in FIG. 3.

FIG. 8 illustrates a block diagram showing an embodiment of an internal configuration of the processor shown in FIG. 3, and FIGS. 9 to 11 illustrate a flowchart showing an image goods search method in accordance with an embodiment of the present disclosure.

Referring first to FIG. 8, the processor 134 in the shopping mall server 130 includes a first and second input image feature vectors receiver 810, a feature vector processor 820, a similar goods searcher 830, and a search result provider 840. In addition, the processor 134 may be configured to identify the terminal 110 of a user who is a registered member of a site provided by the shopping mall server 130 and be linked with the database 133 configured to store information provided to the user terminal 110.

In addition, the processor 134 may be configured to control the shopping mall server 130 to perform an image goods search method that provides similar goods images corresponding to a plurality of goods images input through the user terminal 110 as a search result for recommended goods along with the operation of the input image analyzer 140 described above with reference to FIGS. 4 to 7.

Here, the processor 134 may be implemented to execute commands (or instructions) according to a code of an operating system including the memory 132 and at least one program code. In this case, it may be understood that the components in the processor 134, that are, the first and second input image feature vectors receiver 810, the feature vector processor 820, the similar goods searcher 830, and the search result provider 840 are expressed by distinguishing each different function performed by the processor 134 by control commands provided by the program code stored in the shopping mall server 130.

In addition, as described through FIGS. 4 to 7, the input image analyzer 140 in accordance with an embodiment of the present disclosure is configured to perform an operation of receiving the plurality of goods image information input from the shopping mall server 130, analyzing the plurality of goods image information by executing a deep learning algorithm, calculating feature vectors corresponding thereto, and transmitting the feature vectors to the shopping mall server 130.

Accordingly, the first and second input image feature vectors receiver 810 in the shopping mall server 130 is configured to perform an operation of receiving feature vectors for each of the first and second input images generated and provided by the input image analyzer 140.

Thereafter, the feature vector processor 820 is configured to perform operation processing on feature vectors for each of the received first and second input images to generate the integrated feature vector. Embodiments for the operation processing are described in more detail through FIGS. 9 to 11.

The similar goods searcher 830 is configured to perform an operation of searching for optimal similar goods images matching input image information of the user, through comparison and analysis on the feature vectors of similar goods images previously stored in the database of the shopping mall server 130 with the integrated feature vector generated through the operation processing.

Finally, the search result provider 840 is configured to perform an operation of outputting similar goods images searched through the similar goods searcher 830 to the user terminal 110 as a search result for recommended goods. At this time, the search results for the recommended goods output from the search result provider 840 may be displayed with inclusion of predetermined image information through the display module (e.g. 113 in FIG. 2) of the user terminal 110. For example, when the image goods search application 112*a* downloaded to the user terminal 110 is executed, the display module 113 may be configured to display a search result display window provided by the image goods search application 112*a* on the screen, and the search results for the recommended goods output from the search result provider 840 may be displayed through the search result display window.

Accordingly, the shopping mall server 130 in accordance with an embodiment of the present disclosure is configured to provide optimal similar goods images matching the input image information of the user as search result information for recommended goods, through comparison and analysis on feature vectors for a plurality of goods images (e.g., first input image and second input image) input through the image goods search application installed in the user terminal 110 and transmitted through the network 120 as mentioned above and feature vectors of the similar goods images previously stored in the database of the shopping mall server 130.

Figure 9:
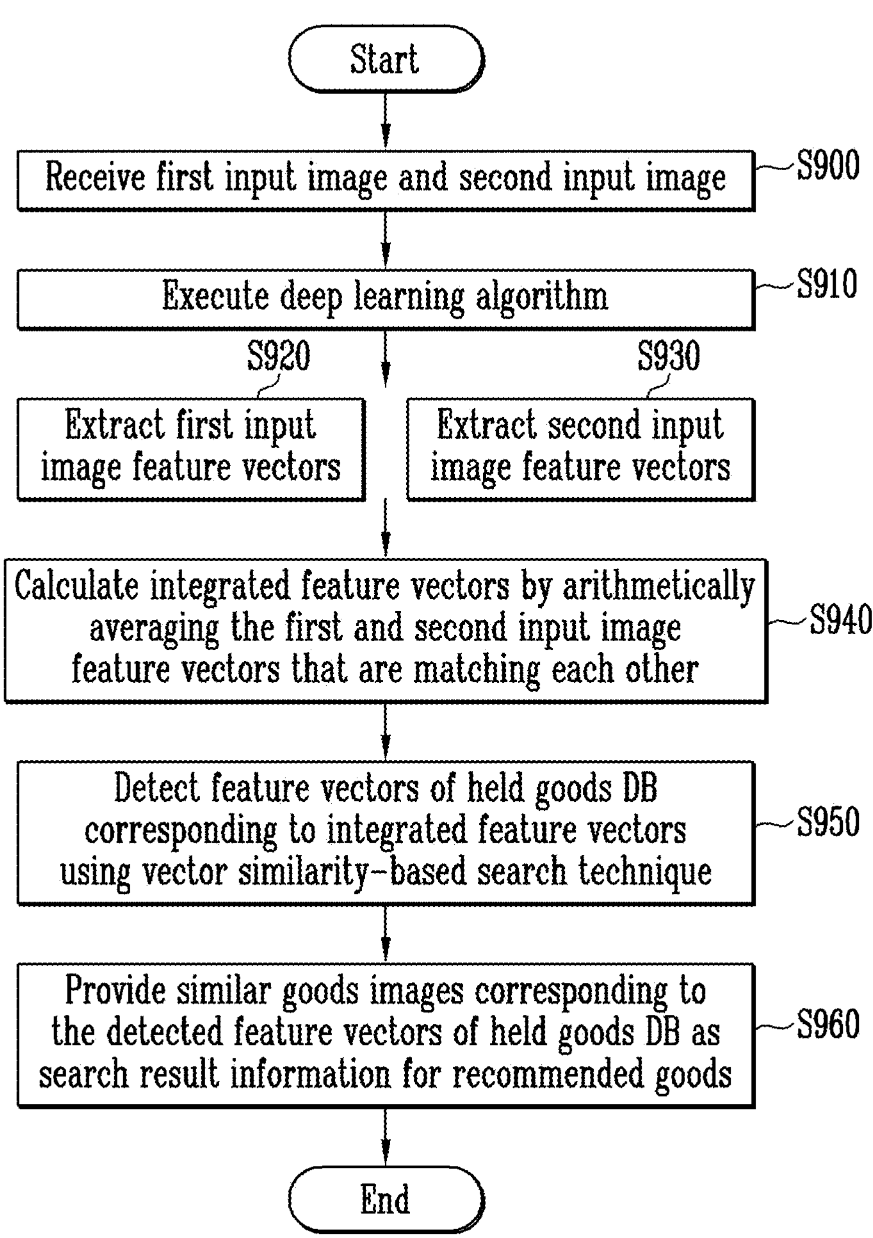
FIG. 9 illustrates a flowchart showing an image goods search method in accordance with a first embodiment of the present disclosure.

FIG. 9 is a flowchart showing the image goods search method in accordance with a first embodiment of the present disclosure.

Referring to FIGS. 4, 8, and 9, the image goods search method in accordance with a first embodiment of the present disclosure will be described as follows. However, in the embodiments shown in FIGS. 4, 8, and 9, goods image information input from the user terminal 110 is described as an example in which there are two goods images which are a first goods image and a second goods image, but this is for convenience of description, and embodiments of the present disclosure are not necessarily limited thereto.

First, when the user terminal 110 accesses the shopping mall server 130 to search for goods, a plurality of goods images stored in the user terminal 110 or searched and captured by the user terminal 110 may be transmitted to the shopping mall server 130 using the image search function of the application installed in the user terminal 110. As mentioned above, in an embodiment of the present disclosure, described is an example in which goods image information input and transmitted from the user terminal 110 are two which are a first input image and a second input image.

Accordingly, the shopping mall server 130 may perform an operation of transmitting the transmitted first input image and the second input image to the input image analyzer 140, and as shown in FIG. 4, the input image receiver 142 in the input image analyzer 140 is configured to perform an operation of receiving the first and second input image information transmitted from the shopping mall server 130 (step S900). For example, the input image receiver 142 may include a first input image receiver 142*a* configured to receive the first input image information and a second input image receiver 142*b* configured to receive the second input image information. The first and second input image information as input metadata are transmitted to the deep learning algorithm executor 144 in the input image analyzer 140.

The deep learning algorithm executor 144 may perform an operation of converting the received first and second input image information into vector image data and analyzing the first and second input image information respectively by executing the deep learning algorithm (step S910). The deep learning algorithm in accordance with an embodiment of the present disclosure may target fashion goods, wherein the deep learning algorithm operation is described in detail through FIGS. 4 to 7.

As a result, information on each of the first and second input images analyzed through the deep learning algorithm executor 144 is transmitted to the feature vector extractor 146 in the input image analyzer 140, and the feature vector extractor 146 performs an operation of extracting a first input image feature vector and a second input image feature vector corresponding to each of the first and second input images (steps S920, S930).

Thereafter, the first and second input image feature vectors corresponding to each of the first and second input images in the feature vector extractor 146 are transmitted to the first and second feature vectors generator/provider 147 of the input image analyzer 140, and each feature vector information generated thereby is analyzed by each input goods image to be provided to the shopping mall server 130. For example, each of the first and second input image feature vector information may be stored in the second database 133*b* in which the first and second input image information is stored.

The steps described above, that is, S900 to S930, are performed by the input image analyzer 140 in accordance with an embodiment of the present disclosure, and subsequent steps, that is, S940 to S960, are sequentially performed by the processor 134 of the shopping mall server 130, that is, the first and second input image feature vectors receiver 810, the feature vector processor 820, the similar goods searcher 830, and the search result provider 840.

More specifically, the first and second input image feature vectors receiver 810 of the shopping mall server 130 is configured to receive first and second input image feature vectors for each of the first and second input images generated and provided by the input image analyzer 140.

Thereafter, the feature vector processor 820 is configured to perform an operation of performing operation processing for the received first and second input image feature vectors to calculate the integrated feature vector.

More specifically, in the embodiment shown in FIG. 9, when performing the calculation of the integrated feature vector, the feature vector processor 820 calculates the integrated feature vector by performing an arithmetic average operation on the first input image feature vector and the second input image feature vector.

For example, assuming that the first input image feature vector is represented as [a, b, c] and the second input image feature vector as [a', b', c'], the integrated feature vector calculated through the feature vector processor 820 in accordance with an embodiment of FIG. 9 may be a value generated by arithmetically averaging the first input image feature vector and the second input image feature vector matching each other, that is, [(a+a')/2, (b+b')/2, (c+c')/2].

Next, the calculated integrated feature vector information is transmitted to the similar goods searcher 830, and the similar goods searcher 830 is configured to perform an operation of searching for optimal similar goods images matching the input image information of the user through comparison and analysis on the integrated feature vector generated through the arithmetic average operation processing and the feature vectors of the similar goods images previously stored in the first database 133*a* of the shopping mall server 130.

More specifically, a vector similarity search technique may be used for the integrated feature vector and the feature vectors of the similar goods images previously stored in the first database 133*a*, thereby detecting feature vectors stored in the first database 133*a* corresponding to the integrated feature vector, that is, similar to the integrated feature vector S950.

Finally, the search result provider 840 may be configured to perform an operation of outputting, to the user terminal 110, feature vectors searched through the similar goods searcher 830, that is, similar goods images corresponding to feature vectors similar to the integrated feature vector as a search result for recommended goods S960.

At this time, the search results for the recommended goods output from the search result provider 840 may be displayed with inclusion of predetermined image information through the display module (e.g. 113 in FIG. 2) of the user terminal 110. For example, when the image goods search application 112*a* downloaded to the user terminal 110 is executed, the display module 113 is configured to display the search result display window provided by the image goods search application 112*a* on the screen, and the search results for the recommended goods output from the search result provider 840 may be displayed through the search result display window.

In addition, in an embodiment of the present disclosure, similar goods images as the search result for the recommended goods displayed in the display module (e.g. 113 in FIG. 2) of the user terminal 110 are displayed in order of distance between the integrated feature vector and the feature vectors of the searched similar goods images.

Figure 10:
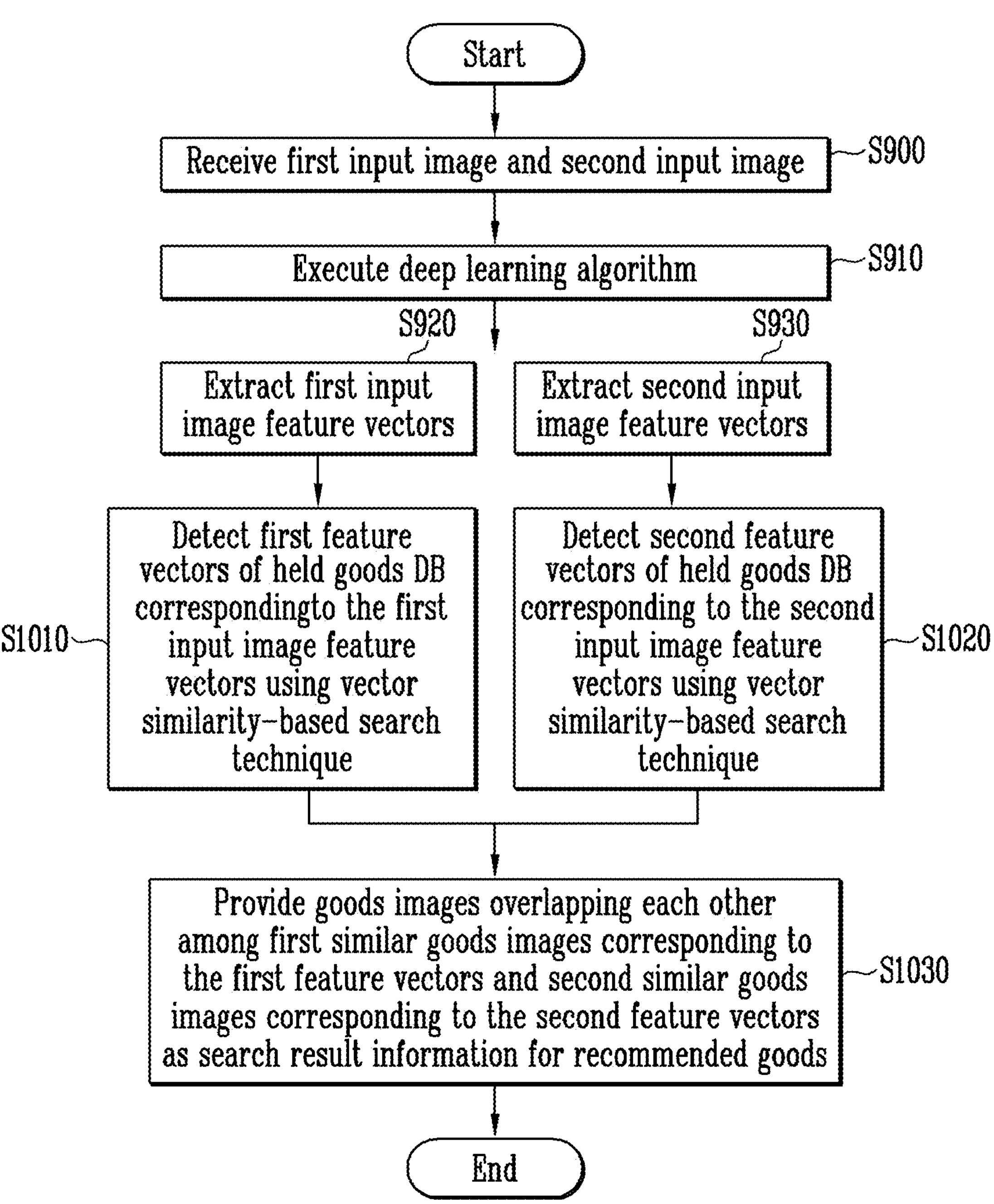
FIG. 10 illustrates a flowchart showing an image goods search method in accordance with a second embodiment of the present disclosure.

FIG. 10 illustrates a flowchart showing a image goods search method in accordance with a second embodiment of the present disclosure.

Referring to FIGS. 4, 8 and 10, the image goods search method in accordance with a second embodiment of the present disclosure will be described as follows.

However, since the steps performed by the input image analyzer 140 mentioned above, that is, S900 to S930, are substantially the same as, or similar to, the first embodiment shown in FIG. 9, a detailed description thereof will be omitted.

Referring to FIG. 10, after steps S900 to S930, steps S1010 to S1030 are sequentially performed by the processor 134 of the shopping mall server 130, that is, the first and second input image feature vectors receiver 810, the feature vector processor 820, the similar goods searcher 830, and the search result provider 840.

More specifically, the first and second input image feature vectors receiver 810 of the shopping mall server 130 is configured to receive first and second input image feature vectors for each of the first and second input images generated and provided by the input image analyzer 140.

Subsequently, in the embodiment shown in FIG. 10, the received first and second input image feature vectors bypass the feature vector processor 820 and are directly transmitted to the similar goods searcher 830.

That is, unlike the embodiment of FIG. 9, in the embodiment of FIG. 10, the process of calculating the integrated feature vector by performing arithmetic average operation on the received first and second input image feature vectors can be omitted.

Accordingly, each of the received first and second input image feature vectors is directly transmitted to the similar goods searcher 830. The similar goods searcher 830 is configured to perform an operation of searching for optimal similar goods images matching the input image information of the user through comparison and analysis on each of the first and second input image feature vectors and feature vectors of similar goods images previously stored in the first database 133*a* of the shopping mall server 130.

More specifically, the first and second input image feature vectors and the feature vectors of the similar goods images previously stored in the first database 133*a* may use the vector similarity search technique, thereby detecting first feature vectors stored in the first database 133*a* similar to the first input image feature vector (step S1010), along with the second feature vectors stored in the first database 133*a* similar to the second input image feature vector (step S1020).

Finally, the search result provider 840 performs an operation of outputting similar goods images overlapping each other to the user terminal 110 as a search result for recommended goods among the first similar goods images corresponding to the first feature vectors searched through the similar goods searcher 830 and the second similar goods images corresponding to the second feature vectors (step S1030).

At this time, the search results for the recommended goods output from the search result provider 840 may be displayed with inclusion of predetermined image information through the display module (e.g. 113 in FIG. 2) of the user terminal 110. For example, when the image goods search application 112*a* downloaded to the user terminal 110 is executed, the display module 113 may be configured to display a search result display window provided by the image goods search application 112*a* on the screen, and the search results for the recommended goods output from the search result provider 840 may be displayed through the search result display window.

In addition, in an embodiment of the present disclosure, similar goods images as search results for recommended goods displayed in the display module (e.g. 113 in FIG. 2) of the user terminal 110 are displayed in order of distance between the integrated feature vector and the feature vectors of the searched similar goods images.

Figure 11:
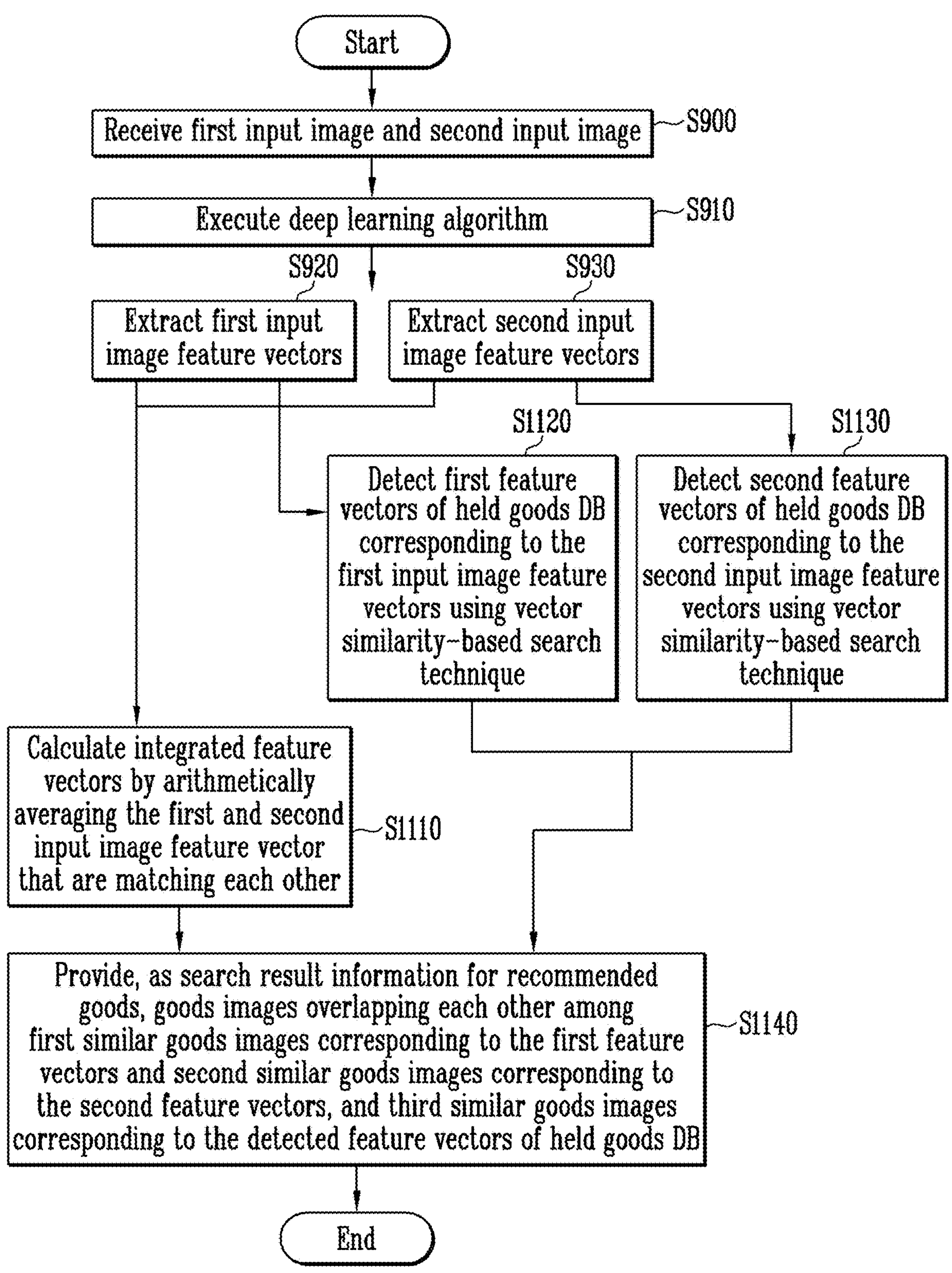
FIG. 11 illustrates a flowchart showing an image goods search method in accordance with a third embodiment of the present disclosure.

FIG. 11 illustrates a flowchart showing a image goods search method in accordance with a third embodiment of the present disclosure.

Referring to FIGS. 4, 8 and 11, the image goods search method in accordance with a third embodiment of the present disclosure will be described as follows.

However, since the steps performed by the input image analyzer 140 mentioned above, that is, S900 to S930, are substantially the same as, or similar to, the first embodiment shown in FIG. 9, a detailed description thereof will be omitted.

Referring to FIG. 11, after steps S900 to S930, steps S1110 to S1140 are sequentially performed by the processor 134 of the shopping mall server 130, that is, the first and second input image feature vectors receiver 810, the feature vector processor 820, the similar goods searcher 830, and the search result provider 840.

In addition, the operation of an embodiment shown in FIG. 11 is implemented along with that of an embodiment of FIG. 9 and an embodiment of FIG. 10 described above.

More specifically, the first and second input image feature vectors receiver 810 of the shopping mall server 130 is configured to receive first and second input image feature vectors for each of the first and second input images generated and provided by the input image analyzer 140.

As illustrated in the embodiment shown in FIG. 11, the feature vector processor 820 performs an arithmetic average operation on the received first input image feature vector and the second input image feature vector to calculate the integrated feature vector in the same manner as in the embodiment of FIG. 9 (step S1110).

For example, assuming that the first input image feature vector is represented as [a, b, c] and the second input image feature vector as [a', b', c'], the integrated feature vector calculated by the feature vector processor 820 in accordance with the embodiment of FIG. 9 may be a value generated by arithmetically averaging the first input image feature vector and the second input image feature vector matching each other, that is, $$\left[(a+a')/2,\ (b+b')/2,\ (c+c')/2\right].$$

In addition, as in the embodiment of FIG. 10, the embodiment shown in FIG. 11 may also perform an operation that the received first and second input image feature vectors bypass the feature vector processor 820 to be transmitted directly to the similar goods searcher 830.

Accordingly, each of the received first and second input image feature vectors is directly transmitted to the similar goods searcher 830. The similar goods searcher 830 is configured to perform an operation of searching for optimal similar goods images matching the input image information of the user through the comparison and analysis on each of the first and second input image feature vectors and feature vectors of similar goods images previously stored in the first database 133*a* in the shopping mall server 130.

More specifically, the vector similarity search technique may be used for the first and second input image feature vectors and the feature vectors of the similar goods images previously stored in the first database 133*a*, thereby detecting the first feature vectors stored in the first database 133*a* similar to the first input image feature vector (step S1120) along with the second feature vectors stored in the first database 133*a* similar to the second input image feature vector (step S1130).

Finally, the search result provider 840 performs an operation of outputting, to the user terminal 110 as a search result for recommended goods, the sum of similar goods images overlapping each other among the first similar goods images corresponding to the first feature vectors searched through the similar goods searcher 830 and the second similar goods images corresponding to the second feature vectors and third similar goods images corresponding to feature vectors similar to the integrated feature vector (step S1140).

At this time, the search results for the recommended goods output from the search result provider 840 may be displayed with inclusion of predetermined image information through the display module (e.g. 113 in FIG. 2) of the user terminal 110. For example, when the image goods search application 112*a* downloaded to the user terminal 110 is executed, the display module 113 may be configured to display a search result display window provided by the image goods search application 112*a* on the screen, and the search results for the recommended goods output from the search result provider 840 may be displayed through the search result display window.

In addition, in an embodiment of the present disclosure, similar goods images as search results for the recommended goods displayed in the display module (e.g. 113 in FIG. 2) of the user terminal 110 are displayed in order of distance between the integrated feature vector and the feature vectors of the searched similar goods images.

As described above, in the present disclosure, certain matters such as specific components and the like have been described by limited embodiments and drawings, but these are provided only to help more general understanding of the present disclosure, but the present disclosure is not limited to the above embodiments, while various modifications and changes may be made from these descriptions by those skilled in the art.

Therefore, the spirit of the present disclosure should not be limited to the described embodiments, and not only the claims described below, but also all those that have equal or equivalent variations of the claims will be said to belong to the scope of the present disclosure.

What is claimed is:

1. A system for searching one or more images of goods, the system comprising:

a shopping mall server communicationally connected to a plurality of user terminals, the shopping mall server configured to provide at least one of the user terminals with similar goods images matching a plurality of input goods images transmitted from the at least one of the user terminals as a search result for recommended goods; and an apparatus communicationally connected with the shopping mall server, the apparatus having a processor configured to receive information on the input goods images from the shopping mall server, calculate feature vectors corresponding to the input goods images, and transmit the calculated feature vectors to the shopping mall server, wherein the shopping mall server comprises a first database configured to store held goods images for respective goods held by the shopping mall server and feature vectors corresponding to the held goods images, and a second database configured to store information on the input goods images transmitted from the at least one of the user terminals, and wherein the processor of the apparatus communicationally connected with the shopping mall server is configured to:

receive first and second input goods images to be input as metadata;

convert information on the received first and second input goods images into vector image data, and execute a deep learning algorithm to analyze the information on the first and second input goods images;

extract feature vectors for each of the first and second input goods images to which the deep learning algorithm is applied; and generate a first input image feature vector and a second input image feature vector based on the extracted feature vectors to provide the feature vectors corresponding to the input goods images to the shopping mall server.

2. The system of claim 1, wherein the shopping mall server is configured to compare and analyze feature vectors each corresponding to a first input goods image and a second input goods image transmitted from the shopping mall server and feature vectors of similar goods images previously stored in the first database to search for a plurality of similar goods images corresponding to combined information of the first and second input goods images.

3. The system of claim 1, wherein the processor of the apparatus communicationally connected with the shopping mall server is configured to analyze the generated first and second input image feature vectors for each corresponding input goods image to be stored in the second database.

4. The system of claim 1, wherein the shopping mall server is configured to:

receive the first and second input image feature vectors from the apparatus communicationally connected with the shopping mall server;

process the received first and second input image feature vectors to generate an integrated feature vector;

search for the similar goods images by comparing and analyzing the first and second input image feature vectors and/or the integrated feature vector and the feature vectors of similar goods images previously stored in the first database; and output the searched similar goods images to the at least one of the user terminals as the search result for the recommended goods.

5. The system of claim 4, wherein the integrated feature vector is a value generated by arithmetically averaging the first input image feature vector and the second input image feature vector that match each other.

6. The system of claim 5, wherein the shopping mall server is configured to compare and analyze the integrated feature vector and the feature vectors of the similar goods images previously stored in the first database, to detect feature vectors similar to the integrated feature vector from the feature vectors stored in the first database.

7. The system of claim 4, wherein the shopping mall server is configured to compare and analyze the first and second input image feature vectors and the feature vectors of the similar goods images previously stored in the first database, to detect first feature vectors, stored in the first database, similar to the first input image feature vector and second feature vectors, stored in the first database, similar to the second input image feature vector.

8. The system of claim 7, wherein the shopping mall server is configured to output, to the at least one of the user terminals as the search result for the recommended goods, similar goods images overlapping each other among first similar goods images corresponding to the detected first feature vectors and second similar goods images corresponding to the detected second feature vectors.

9. The system of claim 4, wherein the similar goods images as the search result for the recommended goods are displayed on the at least one of the user terminals in order of distance between the first and second input image feature vectors and/or the integrated feature vector and the feature vectors of the searched similar goods images.

* * * * *